United States Patent
Padmanabhan et al.

(10) Patent No.: US 6,721,476 B2
(45) Date of Patent: Apr. 13, 2004

(54) OPTICAL DEMULTIPLEXER BASED ON THREE-DIMENSIONALLY PERIODIC PHOTONIC CRYSTALS

(75) Inventors: Aravind Padmanabhan, Plymouth, MN (US); Anvar Zakhidov, McKinney, TX (US); Teresa Marta, White Bear Lake, MN (US); Guenadiy Lazarov, Landing, NJ (US); Dane Larson, New Hope, MN (US)

(73) Assignee: Honeywell International Inc., Morristown, NJ (US)

( * ) Notice: Subject to any disclaimer, the term of this patent is extended or adjusted under 35 U.S.C. 154(b) by 285 days.

(21) Appl. No.: 10/006,520

(22) Filed: Dec. 3, 2001

(65) Prior Publication Data

US 2003/0103721 A1 Jun. 5, 2003

(51) Int. Cl.[7] ............................ G02B 6/293; G02B 6/26; G02B 6/20
(52) U.S. Cl. ............................ 385/24; 385/15; 385/31; 385/37; 385/125
(58) Field of Search .............................. 385/24, 15, 31, 385/125, 18, 37; 216/56; 264/344, 345; 427/128, 249.2, 255.12; 359/244, 245, 247

(56) References Cited

U.S. PATENT DOCUMENTS

| | | | |
|---|---|---|---|
| 6,052,213 A | 4/2000 | Burt et al. | 359/237 |
| 6,261,469 B1 | 7/2001 | Zakhidov et al. | 216/56 |
| 6,517,763 B1 * | 2/2003 | Zakhidov et al. | 264/344 |
| 2002/0074537 A1 * | 6/2002 | John et al. | 252/584 |
| 2002/0196999 A1 * | 12/2002 | Kim et al. | 385/16 |
| 2003/0123827 A1 * | 7/2003 | Salerno et al. | 385/129 |
| 2003/0156319 A1 * | 8/2003 | John et al. | 359/341.5 |

OTHER PUBLICATIONS

"Topical Review: The Future of MEMS in Telecommunications Networks", James A. Walker, J. Micromech. Microeng. 10 (2000 R1–R7. Printed in the UK.

* cited by examiner

Primary Examiner—Hemang Sanghavi
(74) Attorney, Agent, or Firm—Andrew A. Abeyta (57) ABSTRACT

The invention provides photonic crystal optical demultiplexer devices produced from a three-dimensionally-periodic, porous, dielectric, photonic crystalline structure, which has surfaces or interfaces that are inverse replicas of the surfaces of a monodispersed sphere array. Such a photonic crystal optical demultiplexer comprises a three-dimensionally-periodic, porous, dielectric, photonic crystalline structure, which structure has surfaces or interfaces that are inverse replicas of the surfaces of a monodispersed sphere array, wherein necks exists between neighboring spheres in said sphere array and the average sphere diameter does not exceed about 1000 nm. A first optical waveguide is positioned to direct a broad wavelength band of incident light onto the crystalline structure. A second optical waveguide positioned to receive a narrow wavelength band of reflected light from the crystalline structure.

32 Claims, 4 Drawing Sheets

OPTICAL DEMULTIPLEXER BASED ON THREE-DIMENSIONALLY PERIODIC PHOTONIC CRYSTALS

BACKGROUND OF THE INVENTION

1. Field of the Invention

The invention relates to an optical communications device. More particularly, the invention pertains to photonic crystal optical demultiplexer devices produced from a three-dimensionally-periodic, porous, dielectric, photonic crystalline structure, which has surfaces or interfaces that are inverse replicas of the surfaces of a monodispersed sphere array.

2. Technical Background

Optical fibers are key components in integrated optical circuits that route and control optical signals in optical communication systems In such optical communication systems, information is transmitted at infrared optical frequencies by carrier waves that are generated by light sources such as lasers and light-emitting diodes. These optical communication systems offer several advantages over traditional electronic communications systems using copper wires or coaxial cables. They have a greatly increased number of channels of communication, as well as the ability to transmit messages at much higher speeds than the electronic systems.

Optical fibers are thin strands of glass or polymer capable of transmitting an optical signal containing a large amount of information over long distances with very low loss. Communication systems now increasingly employ such optical fibers because of their high speed, low attenuation and wide bandwidth characteristics, which can be used for carrying data, video and voice signals concurrently. In essence, an optical fiber is a small diameter waveguide and light rays are guided along the axis of the fiber with minimum attenuation.

Modern fiber optic communication systems have the ability to simultaneously transfer light signals having differing wavelengths over a single optical fiber. An important part of these communication systems is the use of wavelength division multiplexing, by which a given wavelength band is segmented into separate wavelengths so that multiple signals can be simultaneously carried on a single installed line. A typical optical fiber communications system comprises a source of optical input signals, a length of optical fiber coupled to the source and a receiver for optical signals coupled to the fiber. In multi-wavelength systems a plurality of nodes may be provided along the fiber for adding or dropping wavelength channels.

Multi-wavelength systems use multiplexers and demultiplexers which are capable of dividing the band into given multiples of different wavelengths which are separate but closely spaced. Adding individual wavelengths to a wideband signal, and extracting a given wavelength from a multi-wavelength signal, requires wavelength selective couplers and demultiplexers for selectively controlling specific wavelengths of light. Demultiplexers are advantageous for differentiating and manipulating such optical signals based on their wavelength.

Recent developments in the field of wavelength division multiplexing technology have resulted in increased data bandwidth, an improvement by over two orders of magnitude, over a single optical fiber. These developments have created an increased demand for improved wavelength multiplexer, demultiplexer, and add-drop filters. It would be desired to produce low-cost, compact and high-performance optical demultiplexers for optical communications. An important class of such photonic devices includes photonic band gap structures, also known as photonic crystals. It has now been found that photonic band gap devices can be used to produce low-cost, efficient, and compact multiplexers, demultiplexers, and add-drop filters, thereby permitting the expansion of wavelength division multiplexing technologies from the presently existing telecommunication applications to data communications.

Photonic band gap structures are periodic dielectric structures that can confine and control light in three dimensions. Photonic band gap devices are crystals with periodic structures that, through interference, prevent certain electromagnetic waves from propagating through them. These structures exhibit a photonic bandgap analogous to the electronic bandgap in semiconductors. If the dielectric constants of the materials are different enough, i.e. high contrast, and the absorption of light by the materials is minimal, then scattering at the crystal interfaces can produce many of the same phenomena for photons as the atomic potential does for electrons. Hence it is possible to construct photonic crystals which will reflect light of a chosen wavelength while other longer or shorter wavelengths are transmitted. Light that has a wavelength that lies in the bandgap is prevented from existing inside the crystal and hence is reflected by the crystal. Heretofore, photonic bandgap devices in the wavelength ranges of interest for optical communications (1–2 $\mu$m) have not been produced because the critical dimensions of a structure with the wavelength of the light that is being manipulated and a reduction in the wavelength to the 1–2 $\mu$m range necessitates the fabrication of structures with minimum feature sizes that are in the micron to sub-micron range.

The photonic crystal optical demultiplexers of this invention comprise a photonic crystalline structure positioned between of optical waveguides or fibers including an input fiber and one or more output fibers. The first optical waveguide is positioned to direct a broad wavelength band of incident light onto the crystalline structure and the second optical waveguide is positioned to receive a narrow wavelength band of reflected light from the crystalline structure. Alternatively, the first optical waveguide is positioned to direct a broad wavelength band of incident light onto the crystalline structure and the second optical waveguide is positioned to receive one or more narrow bands of light refracted through the crystalline structure in a prismatic fashion.

DESCRIPTION OF THE INVENTION

The invention provides a photonic bandgap demultiplexer which comprises:

a) a plurality of three-dimensionally-periodic, porous, dielectric, photonic crystalline structures, which structures have surfaces or interfaces that are inverse replicas of the surfaces of a monodispersed sphere array, wherein necks exists between neighboring spheres in said sphere array and the average sphere diameter does not exceed about 1000 nm;

b) a plurality of first optical waveguides, each of the first optical waveguides positioned to direct a broad wavelength band of incident light onto one of the crystalline structures; and c) a plurality of second optical waveguides, each of the second optical waveguides positioned to receive a narrow wavelength band of light reflected from or refracted from one of the crystalline structures.

The invention also provides a photonic crystal optical demultiplexer which comprises:

a) a three-dimensionally-periodic, porous, dielectric, photonic crystalline structure, which structure has surfaces or interfaces that are inverse replicas of the surfaces of a monodispersed sphere array, wherein necks exists between neighboring spheres in said sphere array and the average sphere diameter does not exceed about 1000 nm;

b) a first optical waveguide positioned to direct a broad wavelength band of incident light onto the crystalline structure; and c) one or more second optical waveguides positioned to receive a narrow wavelength band of light reflected from or refracted through the crystalline structure.

The invention further provides process for preparing a three-dimensionally-periodic, porous, dielectric, photonic crystalline structure which comprises forming an array of microscopic spheres on a smooth substrate into a face centered cubic structure having spaces between adjacent spheres, which spheres have an average diameter not exceeding about 1000 nm; sintering the spheres under conditions sufficient to attach adjacent spheres to one another by an intermediate neck; forming a solid silicon structure in the spaces between adjacent spheres by infiltrating silane gas into the spaces in a low pressure chemical vapor deposition process; wherein the silane gas is infiltrated into the spaces at a temperature of from about 450° C. to about 600° C., at a pressure of from about 100 mtorr to about 600 mtorr and at a flow rate of from about 50 sccm/min. to about 150 sccm/min., and then removing the spheres.

DETAILED DESCRIPTION OF THE INVENTION

The first step in the production of the photonic bandgap demultiplexers of the invention is to produce a three-dimensionally-periodic, porous, dielectric, photonic crystalline structure, preferably on a substrate. The structure has surfaces or interfaces that are inverse replicas of the surfaces of a monodispersed sphere array, wherein necks exists between neighboring spheres in said sphere array and the average sphere diameter does not exceed about 1000 nm.

The first step comprises assembling a nearly monodispersed spheres of a material such as $SiO_2$ spheres into an "opal-like" lattice. The term opal, opal-like, opal template designates structures having a packing or spheres that is similar to the well-known packing of $SiO_2$ spheres in natural gem opal. In a preferred embodiment, such assembly is by a sedimentation process whose rate can be enhanced by centrifugation from a colloidal solution of the spheres. The spheres are partially joined together so that finite diameter necks connect neighboring spheres. In a preferred embodiment, this partial joining of neighboring spheres is done by sintering at high temperatures, for example from about 650° C. to about 900° C. for $SiO_2$ spheres. This partially sintered porous opal crystal is then used as a template for obtaining a three-dimensionally periodic assembly of a second material, which is infiltrated into the opal. This second material can be infiltrated into the opal so as to substantially fill the void space of the opal. Next the opal material is dissolved or otherwise removed to obtain a hollow structure that is an inverse replica of the original opal structure.

The primary opal template is the initially formed periodic structure that has the desired lattice periodicity. In the most preferred embodiments, this primary opal template will be a porous lattice of $SiO_2$ spheres that are packed into a face-centered-cubic (fcc) lattice. These and structurally related derivative structures having a structure analogous to that of natural opal will be referred to as opals or opal templates independent of whether or not the spheres in the parent template are of $SiO_2$. Also, the structures obtained by partial or complete filling of the opal void space with a second material, followed by removal of the original opal lattice material, will be called inverse opals, independent of the chemical composition of the primary opal template.

The step of generating an extended interface between spheres is critical for producing inverse opals if the infiltrated material completely covers the internal surface of the spheres in the primary opal template. This extended interface between spheres is most preferably generated by heating the opal-like sphere array to a temperature that is sufficiently high that sintering creates an intersphere neck between neighboring spheres. The temperature and times required for this sintering will depend upon the composition of the spheres, shorter times and higher temperatures typically being equivalent to longer times at lower temperatures. Such sintering process should preferably be accomplished at below the temperature at which the spheres become sufficiently fluid that a nearly spherical shape can not be maintained. To illustrate this approach, in one embodiment the spheres are $SiO_2$ spheres in which the required interface is created by sintering. Such sintering is normally achieved by a two step annealing process. The first step is a low temperature anneal at typically 100–120° C. for 2–3 days to eliminate excess water, and the second step is typically a high temperature anneal at 650–900° C. for several hours, resulting in Si—O—Si linkages between the silica of adjacent spheres. The flow of silica between spheres at high temperatures creates the necks of finite diameter (up to 125 nm for 250 nm spheres) without substantially changing the spherical shape of each sphere. While sintering provides the inter-sphere interface through which the $SiO_2$ can be removed after infiltration, too much sintering prohibits infiltration by closing the passages between the voids in the original fcc silica lattice. The infiltration and extraction processes can proceed through these narrow channels over millimeter opal thickness, thereby replicating periodic structural features of the original opal crystals. The sphere material is preferably mechanically and thermally stable to at least about 300° C., more preferably at least about 500° C., and most preferably at least about 800° C. By mechanical and thermal stability to these temperatures it is meant that these particles have sufficient stability at these temperature to largely maintain the structural regularity of opals based on these spheres. By mechanical and thermal stability it is meant that degradation processes occurring at this temperature leaves a stable product which will not disappear by further gas evolution or fluidization at the specified temperature. The sphere material is preferably monodispersed spheres having an average sphere diameter which does not exceed about 1000 nm. Preferably the average sphere diameter is in the range of from about 100 nm to about 1000 nm. However, these spheres may be composed of materials can be virtually any organic or inorganic composition that satisfies the above stability conditions. Examples are ceramics, salts, metals, carbon phases, and high thermal stability organic polymers.

Non-limiting examples of useful sphere types that are commercially available include poly(tetrafluoroethylene), poly(tetrafluoroethylene-propylene), poly(vinyl chloride), phenolics, graphitized carbon, colloidal gold, glass spheres, hollow glass spheres, and silica. The most preferred spheres are $SiO_2$. For the purposes of this invention the term sphere includes near spherical particles that pack similarly to spheres, such as oblong or icosohedral particles.

Various methods well known in the art can be used to assemble the spheres of the opal template. The most preferred method is by the slow sedimentation of a colloidal suspension of nearly monodispersed spheres. These spheres preferably differ in radii by no more than a factor of 1.05. This crystallization can be optionally accelerated by the application of an electric or magnetic field or field gradient, or by using a centrifuge. Also, in order to accelerate the crystallization process, one can optionally use a low viscosity fluid as the suspension medium for the colloidal particles, such as supercritical water or carbon dioxide. Sphere assembly can optionally be accomplished by the mechanical vibration of either a dry or wet assembly of spheres. The growth of $SiO_2$ opals can be conveniently accomplished by slow crystallization of the monodispersed aqueous colloid by sedimentation. The most preferred structure for the primary opal template is face-centered arrangement of monodispersed spheres. Other preferred structures for the primary opal template are hexagonal-close-packed arrangements of monodispersed spheres, body-centered-cubic arrangements of monodispersed spheres, crystalline structures comprising mixtures of rods and spheres having monodispersed diameters, and crystalline arrangements of two or more sphere types. Preferably from about 20 to about 100 layers of spheres are formed.

The spheres are typically assembled on the surface of a smooth, flat substrate. Useful substrate materials non-exclusively include glass, quartz, borosilicate glass, silicon, sapphire and combinations thereof. Preferably the substrate comprises sapphire. Most preferably the substrate is sapphire which is substantially flat, hydrophilic, HF resistant, optically transparent, and resistant to heat elongation in any direction at temperatures of up to about 800° C.

The spheres are then sintered. Sintering the spheres may be done under conditions sufficient to attach adjacent spheres to one another by an intermediate neck. Such may be conducted at a temperature of from about 650° C. to about 900° C., preferably from about 600° C. to about 800° C., and preferably in an inert gas atmosphere such as nitrogen for from about 2 hours to about 20 hours. Mechanical strength measurements indicate when the sintering is sufficient for the development of the required inter-sphere interfaces. Typical resulting mechanical properties in compression for polycrystalline centimeter-size cubes of sintered 250 nm diameter opals spheres are a modulus of 24 GPa, an ultimate strength of 107 MPa, and a failure strain of 0.8%. The absence of over sintering, leading to void interconnect closure, may be insured by observing the transformation from the initial chalk-like appearance to a transparent, opalescent appearance when the opal is submersed in a liquid having about the same refractive index as the $SiO_2$ spheres.

One then forms a solid structure in the spaces between adjacent spheres by infiltrating a suitable material into the spaces. The selection of the infiltration material depends on the application need. For example, these materials can include optical materials such as diamond, superconductors, redox materials such as conducting organic polymers, piezoelectrics, metals, semiconductors, thermoelectrics, electrostrictive materials, magnetoresistive, and ferromagnetic materials. Examples are diblock and triblock polymers involving linkages of either polystyrene, polybutadiene, polyisoprene, poly(methylacrylate), poly(propylene oxide), poly(dimethylsiloxane), or polyethylene oxide. Preferred materials are semiconductor materials and the most preferred material comprises silicon.

Various methods can be used to obtain infiltration, such as melt or solution infiltration, chemical vapor deposition (CVD) (including variants thereof like plasma-enhanced CVD), gas phase condensation, electrochemical deposition, and reaction of an infiltrated fluid. Examples of these processes, the deposition of a conducting polymer into the void volume of a porous opal is preferably by polymerization from a solution of the corresponding monomer and a suitable oxidant, by electrochemical polymerization, by vapor phase infiltration (involving de-polymerization and re-polymerization), by melt phase infiltration, or by deposition from a solution of the conducting polymer. A preferred method for forming a solid silicon structure in the spaces between adjacent spheres is by infiltrating silane gas into the spaces in a low pressure chemical vapor deposition process; wherein the silane gas is infiltrated into the spaces at a temperature of from about 450° C. to about 600° C., at a pressure of from about 100 mtorr to about 600 mtorr and at a flow rate of from about 50 sccm/min. to about 150 sccm/min. This is conducted for from about 4 hours to about 36 hours. The process is conducted such that the solid silicon structure fills from about 10% to about 100% of the total volume between the spheres, more preferably from about 25% to about 30% of the total volume between the spheres.

The spheres are then removed by extraction. Chemical reaction, melt phase de-infiltration, solution extraction, super-critical fluid extraction, and electrochemical dissolution are useful methods for the extraction processes of this invention. Which method is utilized depends naturally upon the nature of the material being extracted and the material that should be unaffected by such extraction processes.

Figure 1:
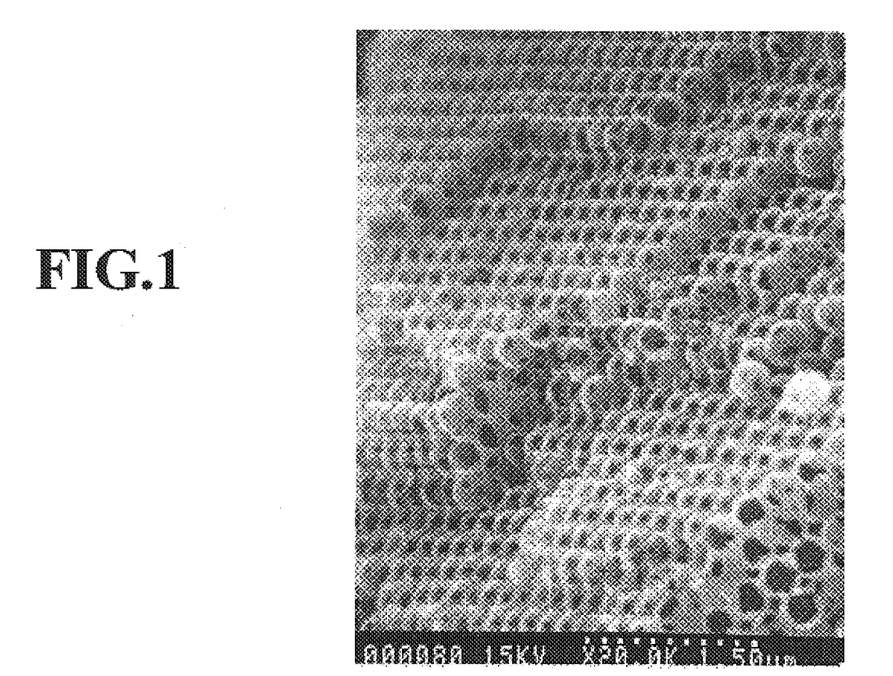
FIG. 1 shows a scanning electron microscope (SEM) photograph of a silicon inverse opal. The silicon shell has thick walls approximately 30 nm thick.
Figure 2:
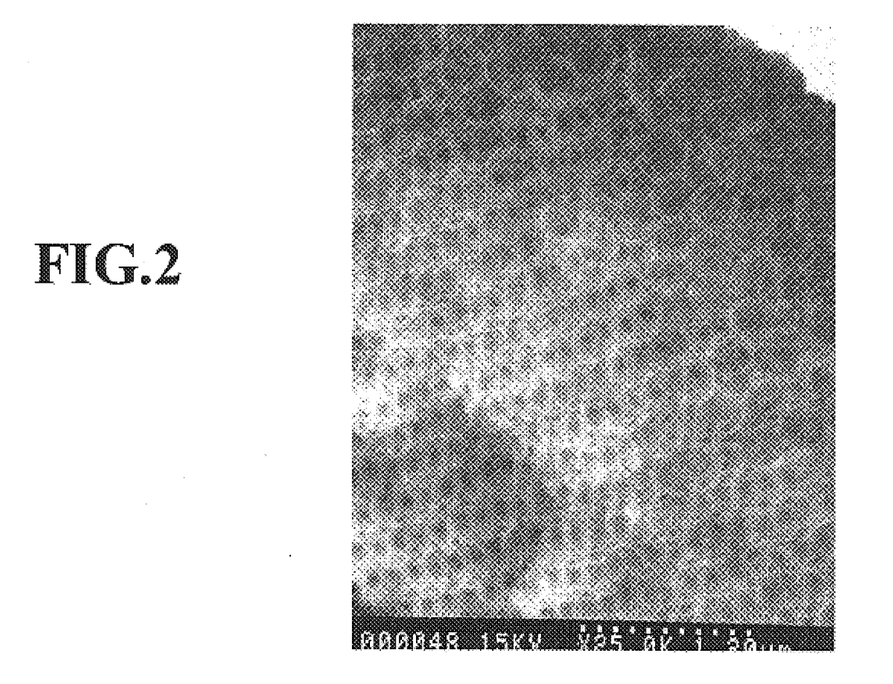
FIG. 2 shows a scanning electron microscope (SEM) photograph of a silicon inverse opal. The silicon shell has thin walls approximately 3 nm thick.
Figure 3:
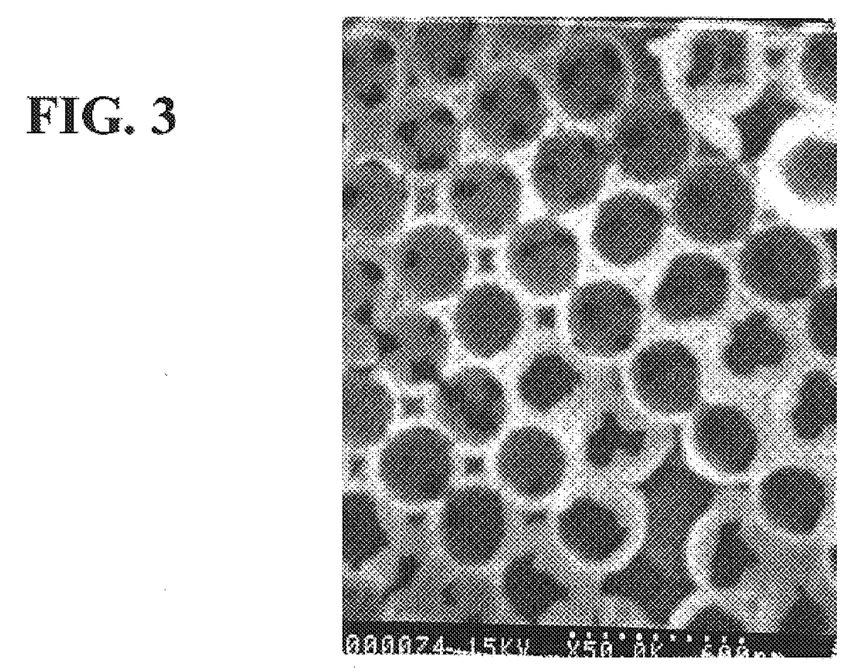
FIG. 3 shows a scanning electron microscope (SEM) photograph of a silicon inverse opal at a {111} cross section of a face-centered-cubic (fcc) lattice.
Figure 4:
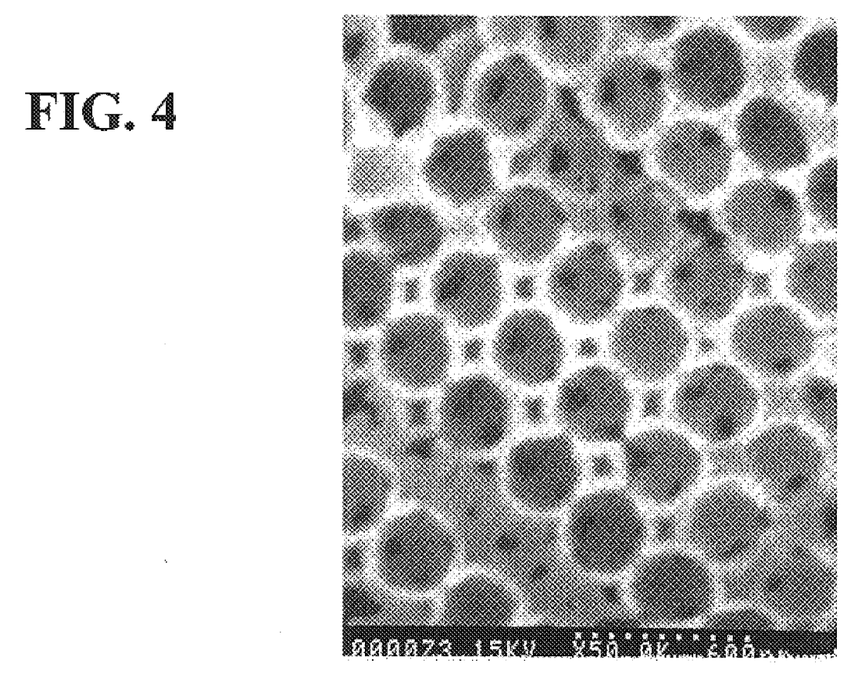
FIG. 4 shows a scanning electron microscope (SEM) photograph of a silicon inverse opal at a {100} cross section of a face-centered-cubic (fcc) lattice.

The choice of the most suitable extraction process is conveniently determined by using the known characteristics of the materials in question, or by experiments that measure the rate at which components of opal derived structures are removed by particular chemicals. For example, the $SiO_2$ spheres of the $SiO_2$ opals can be extracted (or, if desired, partially extracted) by using either an acid (such as aqueous HF) or a base (such as alcoholic, aqueous or non-aqueous sodium hydroxide or potassium hydroxide). Such extraction can be either at ambient or lower temperatures, or at elevated temperatures to accelerate the extraction process. Such extraction processes can be accomplished at various steps in the creation of complex three-dimensionally periodic structures. For example, it has been found that extraction with aqueous KOH can be used to modify the structure of the original opal in useful ways. Limited exposure to the base preferentially etches the sphere regions that are removed from the inter-connect region for sintered $SiO_2$ opal—resulting in a template structure with an enhanced void volume, and dumb-bell-like interconnections between neighboring spheres. Such a structure with rod-like struts between spheres has been sought for the purpose of making photonic bandgap crystals. Most preferably, the removal of the sphere material is by treatment with either an acid, a base, or a solvating or reacting chemical at a temperature of below 200° C. Other less preferred methods can also be used for the extraction processes (or partial extraction processes), such as gas phase removal by sublimation, thermal degradation, and plasma reaction. Most preferably the spheres are removed by dissolving with a hydrogen fluoride vapor, a buffered oxide etch, or a plasma comprising hydrogen fluoride or buffered hydrogen fluoride. The inverse opals synthesized by the present processes are ideal for such optical demultiplexer applications, since the diffraction efficiency of the array is enhanced if the low refractive index phase occupies a much larger volume fraction than the high refractive index phase. For inverse opals made by the processes of this invention, an infiltrated material has filled the void space and the spherical particles have been extracted leaving air spheres. Hence, the low refractive index phase (i.e., the air) is now the majority phase, which maximizes diffraction efficiency. Three dimensionally periodic structures and techniques for their preparation are more fully described in U.S. Pat. No. 6,261,469 which is incorporated herein by reference. By the choice of conditions and materials, the configuration of the inverse opals can be controlled. For example, FIG. 1 shows a scanning electron microscope (SEM) photograph of a silicon inverse opal wherein the silicon shell thickness has thick walls while FIG. 2 shows a silicon inverse opal shell having thin walls. FIG. 3 shows an SEM photograph of silicon inverse opal at a {111} cross section of a face-centered-cubic (fcc) lattice while FIG. 4 shows an SEM photograph of silicon inverse opal at a {100} cross section of a face-centered-cubic (fcc) lattice.

The periodicity of these structures exploits three-dimensional structural periodicities that are in the visible, infrared, or ultraviolet regions to make demultiplexers. The inverse opals are also useful as a dielectric-based photonic bandgap material, especially since a large volume fraction of the low refractive index phase facilitates gap formation. The periodicity-dependent property being exploited is the Bragg scattering of the electromagnetic radiation. The photonic bandgap material can also be made tunable by changing the periodicity of the crystalline structure. This can be achieved by compressing or expanding the crystalline structure, which in turn changes its volume. This change in unit cell parameter can be accomplished by any of the various well-known methods that result in a change of materials dimension. Other examples are the application of an electric field for an electrostrictive or piezoelectric material; a temperature or pressure change for either a shape memory material; the electrically-induced change in dimensions; or a thermally-induced change. Depending on the choice of materials and operating conditions, these changes can be either reversible or irreversible, and can include the effects of refractive index change. For example, if transparent non-constraining electrodes are deposited on opposite sides of the flat plates and an electrical voltage is applied, the material will shrink. This electrically-induced shrinkage causes a change because of a shift in the Bragg diffraction of the inverse opal.

Figure 5:
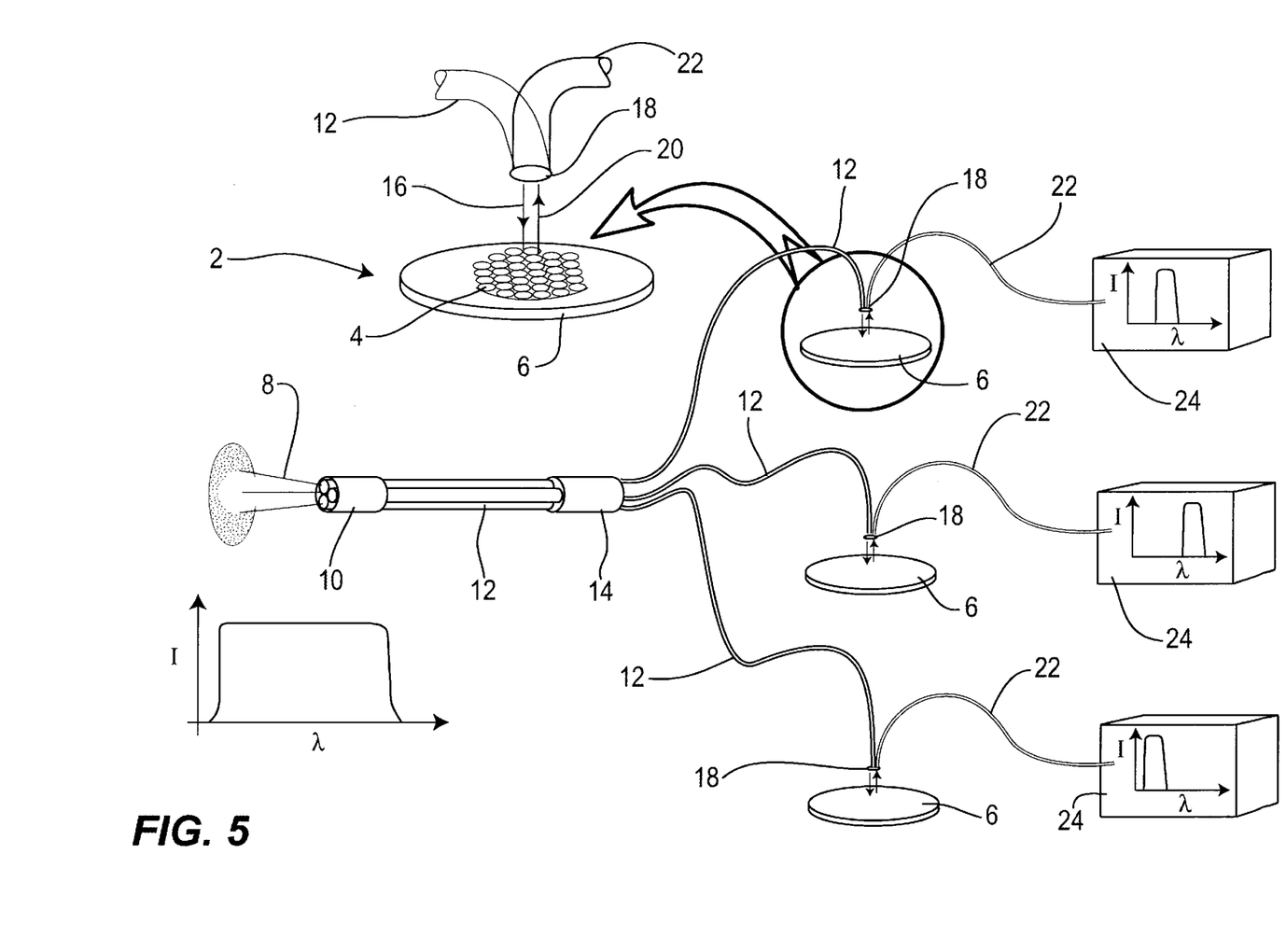
FIG. 5 is a schematic representation of the use of a photonic bandgap demultiplexer splitting a broadband light source into three narrower light bands by reflection from three crystalline structures.

FIG. 5 shows a schematic representation of photonic bandgap demultiplexers splitting a broadband light source into three narrower bands. A photonic bandgap crystal device 2, comprises a three-dimensionally-periodic, porous, dielectric, photonic crystalline structure 4 formed on a substrate 6. A broadband light source 8 is directed to collecting lens 10 and the entire broadband of wavelengths λ, having intensity I, is directed through three input fibers 12. The input fibers 12 split off from ferrule junction 14 and provide the full broadband of wavelengths 16 incident on crystalline structure 4 via collimating lens 18. Only a portion of the full broadband of wavelengths 16 are reflected by the crystalline structure 4. The wavelengths which are deflected depend on the structure of the crystalline structure 4. Reflected wavelengths 20 pass through to the output fibers 22 via collimating lens 18 to one of the detectors 24. In this example, the three photonic bandgap crystal devices 2 are configured to reflect different narrow wavelength bands as provided by the broadband light source 8. Preferably, each of the optical fibers or waveguides are capable of transmitting light having a wavelength in the range of from about 1300 to about 1600 nm. Preferably the input optical fibers are positioned at an angle of from about 30 degrees to about 70 degrees normal of the surface of the crystalline structure.

Control on the direction of propagation of light of a specified frequency results from a change of the diffraction angle of this light because of a change in the unit cell parameter of the opal derived structure. A superprism behavior is noticed that is exhibited by silicon inverse opals for frequencies or wavelengths that are close to the photonic bandgap edges, where the wavelength dispersion characteristics of the structure deviates from the linear relationship $\omega=ck$. The derivative $d\omega/dk$ becomes 0 at the band edges, or its inverse, the group velocity $v_g=dk/d\omega$, approaches infinity. The infinite value of the group velocity implies that a small change in frequency is expected to give rise to a large change in the effective refractive index of the structure, the silicon inverse opal in this case, and hence a large change in the refracted angle of the light of that frequency. This is called the superprism effect. In the modeling, a beam of light was incident at an angle $\theta_i$ to the normal along the stacking direction. The plane of incidence (ΓLX) was identified by the band diagram. Using the calculated band structure, the refraction angle $\theta_r$ from the photonic crystal is evaluated for different incident frequencies υ near the photonic band edge. For a broadband wavelength beam that is made to be incident on the silicon inverse opal structure at angles between 30–70 degrees from the normal, small changes (1–10% change) in the frequency (or wavelength) of the incident light causes large changes in refracted angles (20–70%) of the output light, provided these frequencies (or wavelengths) are chosen to be close to the upper band edges. Hence this structure acts like a highly dispersive prism or a superprism.

Figure 6:
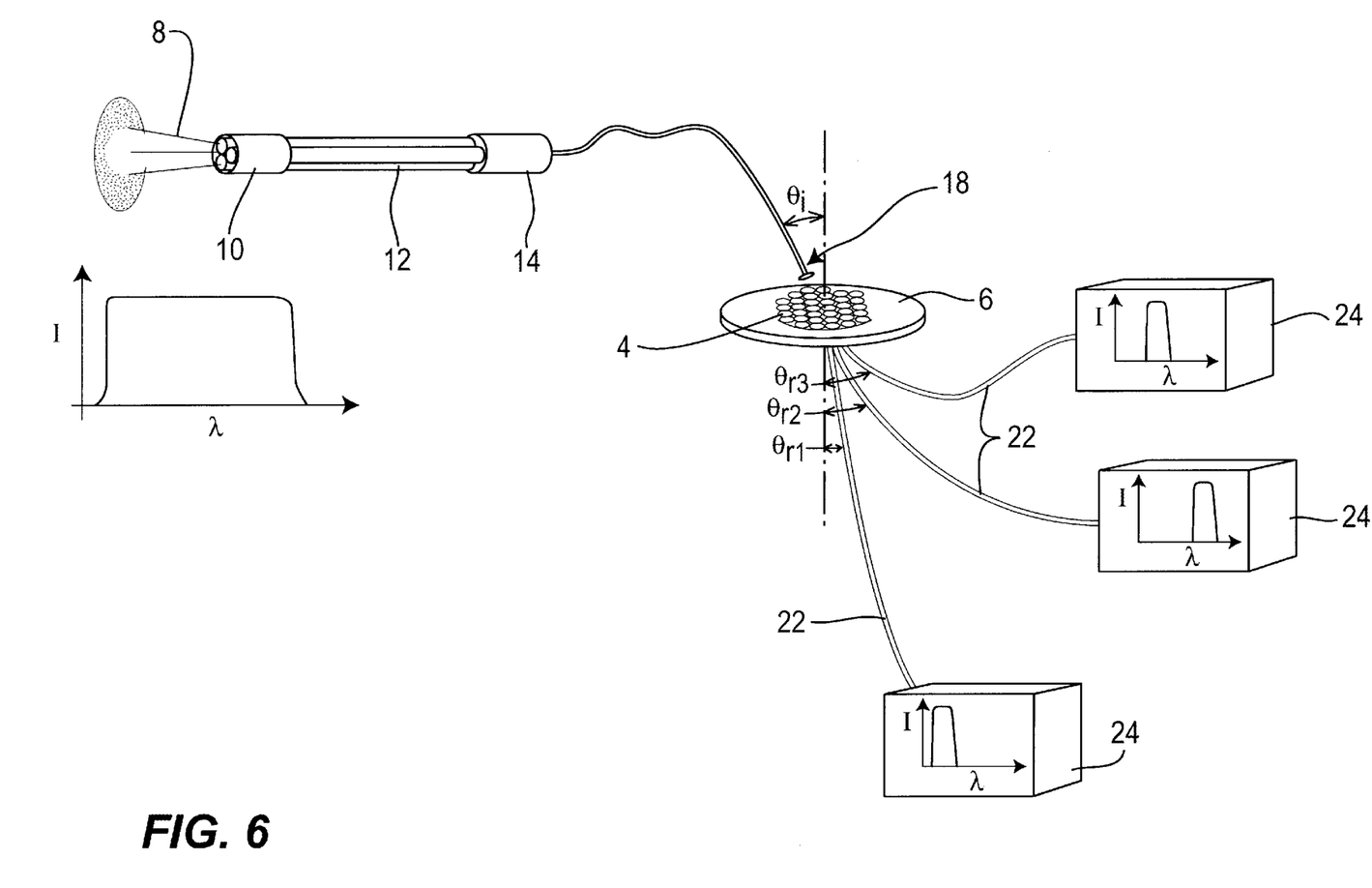
FIG. 6 is a schematic representation of the use of a photonic bandgap demultiplexer splitting a broadband light source into three narrower light bands by prismatic refraction through a single crystalline structure.

FIG. 6 illustrates a photonic bandgap demultiplexers splitting a broadband light source into three narrower refracted bands using the superprism effect. A photonic bandgap crystal device, comprises a three-dimensionally-periodic, porous, dielectric, photonic crystalline structure 4 formed on a substrate 6. A broadband light source 8 is directed to collecting lens 10 and the entire broadband of wavelengths λ, having intensity I, is directed through input fibers 12. An input fiber 12 splits off from ferrule junction 14 and provides the full broadband of wavelengths incident on crystalline structure 4 via collimating lens 18. The input optical fiber is positioned at an incident angle $\theta_i$ of from about 30 degrees to about 70 degrees normal to the surface of the crystalline structure. The broadband of wavelengths are refracted through the crystalline structure 4 at refraction angles $\theta_{r1}$, $\theta_{r2}$ and $\theta_{r3}$. The wavelengths which are refracted depend on the structure of the crystalline structure 4. Reflected wavelengths pass through to the output fibers 22 to one of the detectors 24. In this example, the photonic bandgap crystal device is configured to refract different narrow wavelength bands as provided by the broadband light source 8.

In another embodiment of the invention, the crystalline structures 4 are tunable or otherwise controlled to a desired wavelength by alternately compressing and expanding the crystalline structure, for example by means of a piezoelectric arrangement attached to the crystalline structure. The compressed crystalline structure will reflect a different wavelength than an uncompressed structure. The wavelength of choice may be tuned by the degree of compression or expansion. This may be done by clamping a piezoelectric material onto the crystalline structure and applying a voltage to the piezoelectric material via suitable electrodes. Alternatively, a liquid crystal material may be imbibed on the crystalline structure forming a modified crystalline structure which is capable of splitting an input broadband wavelength into wavelength components via a filtering effect. The composite of the liquid crystal material and the crystalline structure forms a modified crystalline structure which changes it refractive index when a voltage is applied to it via appropriate electrodes.

The following non-limiting examples serve to illustrate the invention. It will be appreciated that variations in proportions and alternatives in elements of the components of the photosensitive coating composition will be apparent to those skilled in the art and are within the scope of the present invention.

EXAMPLE 1

A smooth sapphire substrate is positioned on the bottom of a teflon coated aluminum cup partially filled with water. Microscopic spheres of silicon dioxide average diameter of about 200 nm are slowly added to the cup. The water is drained from the bottom of the cup leaving a face centered cubic structure of about 50 layers of spheres. The spheres are sintered by heating a 650° C. for five hours causing an attaching of adjacent spheres to one another by an intermediate neck thus forming a sintered porous opal.

A sheet of this opal having a thickness of 0.01 mm, a length of 60 mm, and a wide of 20 mm is placed into the CVD chamber and evacuated to $10^{-3}$ mtorr. Then a precursor gas composed of 97% nitrogen and 3% silane ($SiH_4$) is introduced into the CVD chamber. This precursor gas is delivered with the rate 100 sccm per minute in order to maintain the pressure 400 mtorr. The temperature is maintained at 500° C. and held at this temperature for 24 hours. Examination of the surface of this opal sheet shows that the silicon has deposited throughout the opal sample. SEM micrographs, FIGS. 1–4, show that this deposited silicon is in the form of closely spaced, non-percolated particles within the opal void spaces.

The solid silicon structure fills about 26% of the total volume between the spheres. The $SiO_2$ spheres are removed from this sample by dissolution in hydrofluoric acid (48%) for three hours. The $SiO_2$-free sample is then thoroughly washed with water and then dried over anhydrous $CaSO_4$ for one hour under vacuum. Scanning electron microscopy (SEM) investigation of a surface of this inverse opal indicates that all silica spheres are dissolved by the hydrofluoric acid. The SEM reveals a periodically arranged and interconnected structure that reliably replicates the void space in the original $SiO_2$ opal.

EXAMPLE 2

A monolayer of spheres is formed by loading a concave glass cell with a dilute silica suspension (~1 wt. % solids). After drying, this procedure is repeated several times with the same amount of dilute silica suspension to obtain an ordered film at the center of the cell comprising about 20 layers of silicon spheres. The spheres are sintered by heating a 650° C. for five hours causing an attaching of adjacent spheres to one another by an intermediate neck thus forming a sintered porous opal. A sample of this opal is placed into the CVD chamber and evacuated to $10^{-3}$ mtorr. A precursor gas composed of 97% nitrogen and 3% silane ($SiH_4$) is introduced into the CVD chamber. This precursor gas is delivered at a rate of 100 sccm per minute in order to maintain the pressure 400 mtorr. The temperature is maintained at 500° C. and held at this temperature for 36 hours. Examination of the surface of this opal sheet shows that the silicon is deposited throughout the opal sample. SEM micrographs show that this deposited silicon is in the form of closely spaced, non-percolated particles within the opal void spaces. The solid silicon structure fills about 26% of the total volume between the spheres. The $SiO_2$ spheres are moved from this sample by etching of the silica nanospheres in buffered hydrofluoric acid (BHF). This is done by first etching a small hole in the silicon and immersing in BHF. The $SiO_2$-free sample is then thoroughly washed with water and then dried over anhydrous $CaSO_4$ for one hour under vacuum. Scanning electron microscopy (SEM) investigation of a surface of this inverse opal indicates that all silica spheres are dissolved by the hydrofluoric acid. The SEM reveals a periodically arranged and interconnected structure that reliably replicates the void space in the original $SiO_2$ opal. This may be seen in FIGS. 1–4.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A photonic crystal optical demultiplexer which comprises:
   a) a three-dimensionally-periodic, porous, dielectric, photonic crystalline structure, which structure has surfaces or interfaces that are inverse replicas of the surfaces of a monodispersed sphere array, wherein necks exists between neighboring spheres in said sphere array and the average sphere diameter does not exceed about 1000 nm;
   b) a first optical waveguide positioned to direct a broad wavelength band of incident light onto the crystalline structure; and
   c) one or more second optical waveguides positioned to receive a narrow wavelength band of light reflected from or refracted through the crystalline structure.

2. The demultiplexer of claim 1 wherein the one or more second optical waveguides receive a narrow wavelength band of light reflected from the crystalline structure.

3. The demultiplexer of claim 1 wherein the one or more second optical waveguides receive a narrow wavelength band of light refracted through the crystalline structure.

4. The demultiplexer of claim 1 wherein the average sphere diameter is in the range of from about 100 nm to about 1000 nm.

5. The demultiplexer of claim 1 wherein the first optical waveguide and the one or more second optical waveguides comprise optical fibers.

6. The demultiplexer of claim 5 further comprising a collimating lens between the first optical waveguide and the crystalline structure.

7. The demultiplexer of claim 5 further comprising a collimating lens between the one or more second optical waveguides and the crystalline structure.

8. The demultiplexer of claim 1 wherein each of the first optical waveguide and the one or more second optical waveguides are capable of transmitting light having a wavelength in the range of from about 1300 to about 1600 nm.

9. The demultiplexer of claim 1 wherein the crystalline structure comprises a semiconductor material.

10. The demultiplexer of claim 1 wherein the crystalline structure comprises silicon.

11. The demultiplexer of claim 1 wherein the crystalline structure is positioned on a surface of a substrate.

12. The demultiplexer of claim 1 wherein the crystalline structure is positioned on a surface of a substrate, which substrate comprises a material selected from the group consisting of glass, quartz, borosilicate glass, silicon, sapphire and combinations thereof.

13. The demultiplexer of claim 1 wherein the crystalline structure is positioned on a surface of a sapphire substrate.

14. The demultiplexer of claim 1 wherein the crystalline structure is positioned on a surface of a sapphire substrate, which sapphire substrate is substantially flat, hydrophilic, HF resistant, optically transparent, and resistant to heat elongation in any direction at temperatures of up to about 800° C.

15. The demultiplexer of claim 1 further comprising a device for alternately compressing and expanding the crystalline structure.

16. The demultiplexer of claim 1 further comprising a piezoelectric device for alternately compressing and expanding the crystalline structure.

17. The demultiplexer of claim 1 further comprising a liquid crystal material that is imbibed on the crystalline structure forming a modified crystalline structure which is capable of splitting an input broadband wavelength into its wavelength components.

18. The demultiplexer of claim 1 wherein the first optical waveguide is positioned at an angle of from about 30 degrees to about 70 degrees normal of the surface of the crystalline structure.

19. A photonic bandgap demultiplexer which comprises:
a) a plurality of three-dimensionally-periodic, porous, dielectric, photonic crystalline structures, which structures have surfaces or interfaces that are inverse replicas of the surfaces of a monodispersed sphere array, wherein necks exists between neighboring spheres in said sphere array and the average sphere diameter does not exceed about 1000 nm;
b) a plurality of first optical waveguides, each of the first optical waveguides positioned to direct a broad wavelength band of incident light onto one of the crystalline structures; and
c) a plurality of second optical waveguides, each of the second optical waveguides positioned to receive a narrow wavelength band of light reflected from or refracted from one of the crystalline structures.

20. The demultiplexer of claim 19 wherein the one or more second optical waveguides receive a narrow wavelength band of light reflected from the crystalline structure.

21. The demultiplexer of claim 19 wherein the one or more second optical waveguides receive a narrow wavelength band of light refracted through the crystalline structure.

22. The demultiplexer of claim 19 wherein the first optical waveguides and the second optical waveguides comprise optical fibers.

23. The demultiplexer of claim 22 further comprising a collimating lens between each of the first optical waveguides and its corresponding crystalline structure.

24. The demultiplexer of claim 22 further comprising a collimating lens between each of the second optical waveguides and its corresponding crystalline structure.

25. The demultiplexer of claim 19 wherein each of the first optical waveguides and the second optical waveguides are capable of transmitting light having a wavelength in the range of from about 1300 to about 1600 nm.

26. The demultiplexer of claim 19 wherein the crystalline structures comprises silicon.

27. The demultiplexer of claim 19 wherein the crystalline structures are positioned on a surface of a substrate.

28. The demultiplexer of claim 19 wherein the crystalline structures are positioned on a surface of a sapphire substrate.

29. The demultiplexer of claim 19 further comprising a device for alternately compressing and expanding each crystalline structure.

30. The demultiplexer of claim 19 further comprising a piezoelectric device for alternately compressing and expanding each crystalline structure.

31. The demultiplexer of claim 19 further comprising a liquid crystal material that is imbibed on the crystalline structure forming a modified crystalline structure which is capable of splitting an input broadband wavelength into its wavelength components.

32. The demultiplexer of claim 19 wherein each first optical waveguide is positioned at an angle of from about 30 degrees to about 70 degrees normal of a surface of a crystalline structure.

* * * * *